(12) United States Patent
McCloskey et al.

(10) Patent No.: US 6,403,754 B1
(45) Date of Patent: Jun. 11, 2002

(54) OPTIMIZATION OF POLYCARBONATE PREPARATION BY TRANSESTERIFICATION

(75) Inventors: Patrick Joseph McCloskey, Watervliet; Paul Michael Smigelski, Jr.; Timothy Brydon Burnell, both of Schenectady, all of NY (US); Juan Rodriques Ordonez; Ignacia Vic Fernandez, both of Madrid (ES); Gerardo Hidalgo-Llinas, Cartagena (ES); Rudy Francois Alain J. Peemans, Erps-Kwerps (BE); Edward Venama, Bergen op Zoom (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/770,487

(22) Filed: Jan. 29, 2001

(51) Int. Cl.$^7$ ................................ C08G 64/00
(52) U.S. Cl. ...................... 528/196; 528/198
(58) Field of Search ................... 528/196, 198

(56) References Cited

U.S. PATENT DOCUMENTS 5,026,817 A  6/1991  Sakashita et al. ........... 528/199

FOREIGN PATENT DOCUMENTS

EP  677545 B1  10/1995

*Primary Examiner*—Terressa M. Boykin
(74) *Attorney, Agent, or Firm*—Andrew J. Caruso; Noreen C. Johnson

(57) ABSTRACT

Acidic impurities in dihydroxyaromatic compounds such as bisphenol A, as illustrated by sulfonic acids and mercaptocarboxylic acids, can have an adverse effect on the molecular weight of a polycarbonate prepared therefrom by transesterification. The same is true of acidic impurities in diaryl carbonates such as diphenyl carbonate, as illustrated by salicylic acid and ferric chloride. The reagents are analyzed for these impurities. Based on the analysis, the reagents are discarded or recycled, or a compensatory amount of alkali metal hydroxide is employed as a catalyst in the reaction.

11 Claims, No Drawings

OPTIMIZATION OF POLYCARBONATE PREPARATION BY TRANSESTERIFICATION

BACKGROUND OF THE INVENTION

This invention relates to polycarbonate preparation, and more particularly to a method for producing polycarbonates which are consistent in their property profiles using the melt polymerization method.

Polycarbonates have long been prepared by the interfacial method, wherein a dihydroxy compound such as 2,2-bis(4-hydroxyphenyl)propane ("bisphenol A") undergoes reaction with phosgene in a mixed aqueous-organic system under alkaline conditions. This method is problematic for several reasons, including the use of environmentally polluting solvents such as methylene chloride and the use of phosgene, a very toxic gas.

An alternative method of polycarbonate preparation, the transesterification or melt method, is superior from an environmental standpoint. It involves the reaction of the dihydroxy compound with a diaryl carbonate such as diphenyl carbonate. This reaction is conducted under melt conditions at temperatures in the range of about 250–350° C., normally in two stages: a first stage of oligomer formation and a second stage of molecular weight building. Catalysts are normally employed, in particular an alkali metal hydroxide and a tetraalkylammonium or tetraalkylphosphonium base, usually a hydroxide. The proportion of alkali metal hydroxide is typically about 0.01–1,000 and often about 1 molar ppm, and the proportion of quaternary compound in the range of about 1–10,000 molar ppm, based on dihydroxy compound.

The products of melt polycarbonate formation can, however, vary widely in their property profiles. For example, molecular weights and physical properties such as color and impact strength can vary over a wide range. It is frequently found that the proportion of "Fries product", i.e., the branched product obtained by rearrangement of an aryl carbonate group to an o-hydroxyketoaryl group followed by continued polymerization, is higher than desired, and this and other variations can cause degradation of ductility, melt stability and hydrolytic stability.

The two most common reagents for melt polycarbonate formation, bisphenol A and diphenyl carbonate, are both typically synthesized under acidic conditions. Bisphenol A may be economically prepared by the reaction of phenol with acetone in the presence of a sulfonated polystyrene; i.e., a sulfonated ion exchange resin in the acid form. Also usually present as a promoter is a mercapto carboxylic acid such as 3-mercaptopropionic acid.

Diphenyl carbonate may be prepared from phenol by various methods. These include oxidative carbonylation with oxygen and carbon monoxide, condensation with phosgene and transesterification with a dialkyl carbonate. A by-product of any such reaction which involves distillation in the presence of an acidic compound is phenyl salicylate or its hydrolysis product, salicylic acid. The diphenyl carbonate-forming reaction is also carried out under conditions which often include the presence of metallic compounds, e.g., iron compounds formed by corrosion of iron-containing reaction vessels by strongly acidic compounds also present.

According to U.S. Pat. No. 5,026,817, melt polycarbonate formation is advantageously conducted under conditions which include low proportions of hydrolyzable chloride ion, sodium ion and "iron ion". European patent application 677,545 suggests the use of diaryl carbonates substantially free from phenyl salicylate, o-phenoxybenzoic acid and its esters, "tin ion" and methyl phenyl carbonate. Beyond these two documents, however, little is known about the effect on melt polymerization of by-products in the polycarbonate-forming reagents.

SUMMARY OF THE INVENTION

The present invention is based on the discovery that the presence of even very small proportions of acidic impurities in the reagents for polycarbonate formation by the melt method has a significant effect on many properties of the product, and on the reaction itself. In part, the invention contemplates various procedures for eliminating the acidic impurities or minimizing their effect.

Accordingly, the invention is a method for optimizing polycarbonate formation by a transesterification reaction between the reagents diaryl carbonate and dihydroxyaromatic compound in the presence of a catalyst system comprising at least one alkali metal hydroxide, which comprises:

(A) analyzing at least one of said reagents for acidic impurities including at least one of sulfonic acids, mercaptocarboxylic acids, salicylic acid and ferric chloride, to determine whether the following threshold values have been exceeded:
  sulfonic acids—0.1 molar ppm based on dihydroxyaromatic compound,
  mercaptocarboxylic acids—5 molar ppm based on dihydroxyaromatic compound,
  salicylic acid—0.15 molar ppm based on dihydroxyaromatic compound,
  ferric chloride—200 ppb by weight based on dihydroxyaromatic compound;

and if so, either:

(B) discarding or recycling any reagent exceeding at least one of said threshold values, or (C) establishing the level of alkali metal hydroxide in the polycarbonate-forming reaction mixture at a value which is at most 1 molar ppm, based on dihydroxyaromatic compound, in excess of that of at least one of sulfonic acid, mercaptocarboxylic acid, salicylic acid and ferric chloride.

DETAILED DESCRIPTION; PREFERRED EMBODIMENTS

The polycarbonates whose formation may be optimized by the method of this invention include those comprising structural groups having one or more structures of the formula

wherein A is a divalent aromatic radical which may be an aromatic hydrocarbon or a substituted aromatic hydrocarbon radical, with illustrative substituents being alkyl, cycloalkyl, alkenyl (e.g., crosslinkable-graftable moieties such as allyl), halo (especially fluoro, chloro and/or bromo), nitro and alkoxy.

The preferred A values have the formula

wherein each of $A^1$ and $A^2$ is a monocyclic divalent aromatic radical and Y is a single bond or a bridging radical in which one or two atoms separate $A^1$ from $A^2$. The free valence bonds in formula I are usually in the meta or para positions of $A^1$ and $A^2$ in relation to Y.

In formula II, the $A^1$ and $A^2$ values may be unsubstituted phenylene or substituted derivatives thereof wherein the substituents are as defined for A. Unsubstituted phenylene radicals are preferred, but it is also contemplated to employ, for example, polymers in which each of $A^1$ and $A^2$ has two methyl substituents in ortho positions to the free valence bond. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated $C_{1-12}$ aliphatic or alicyclic radical. Illustrative radicals are methylene, cyclohexylmethylene, [2.2.1]bicycloheptylmethylene, ethylene, ethylidene, 2,2-propylidene, 1,1-(2,2-dimethylpropylidene), phenylethylidene, cyclohexylidene, 3,3,5-trimethylcyclohexylidene, cyclopentadecylidene, cyclododecylidene, 9,9-fluorenylidene and 2,2-adamantylidene, especially an alkylidene radical. Aryl-substituted radicals are included, as are unsaturated radicals and radicals containing atoms other than carbon and hydrogen; e.g., oxy groups. Substituents such as those previously enumerated may be present on the aliphatic, alicyclic and aromatic portions of the Y group.

For most purposes, the preferred units containing moieties of formula II are those in which each of $A^1$ and $A^2$ is p-phenylene and Y is isopropylidene; i.e., those derived from bisphenol A.

The polycarbonate is prepared, according to the invention, by the transesterification reaction of at least one dihydroxyaromatic compound, preferably a bisphenol and most preferably bisphenol A (hereinafter sometimes simply "BPA" for brevity), with a diaryl carbonate, preferably diphenyl carbonate (hereinafter sometimes "DPC"). For the sake of convenience, frequent reference to BPA and DPC will be made hereinafter, but it should be understood that other dihydroxyaromatic compounds and diaryl carbonates may be substituted therefor when appropriate, and that the salicylic acid recited herein may be replaced by an analogous compound if other diaryl carbonates are employed.

As is conventional in the art, the transesterification reaction is performed in the melt and in the presence of one or more catalytic species. The essential catalyst, for the purposes of this invention, is at least one alkali metal hydroxide, usually sodium hydroxide (NaOH). Again for the sake of convenience, frequent but non-limiting reference to NaOH will be made hereinafter.

In addition to the NaOH, a basic co-catalyst is usually present. Suitable basic co-catalysts include quaternary ammonium compounds, quaternary phosphonium compounds and mixtures thereof. Examples of quaternary ammonium compounds are tetramethylammonium hydroxide (hereinafter sometimes "TMAH"); tetraethylammonium hydroxide; tetra-n-butylammonium hydroxide and trimethylbenzylammonium hydroxide. Examples of suitable quaternary phosphonium compounds are tetramethylphosphonium hydroxide; tetraethylphosphonium hydroxide and tetra-n-butylphosphonium hydroxide. TMAH is usually preferred.

The molar ratio of DPC to BPA is generally in the range of about 1.01–1.20:1, preferably about 1.05–1.10:1. As previously mentioned, the proportion of NaOH is typically about 0.01–1,000 and often about 1 molar ppm, and the proportion of co-catalyst in the range of about 1–10,000 molar ppm, based on BPA.

There are various sources of acidic impurities in BPA and DPC. In BPA, two primary types of such impurities are found: sulfonic acids, resulting from the loss of low molecular weight oligomers from sulfonic acid ion exchange resins used in the synthesis of BPA; and mercaptocarboxylic acids such as 3-mercaptopropionic acid, present as promoters in the same synthesis. Each of these, when present in the BPA, can neutralize the basic catalyst, resulting in a significant decrease in molecular weight build of the polycarbonate. In particular, the molecular weight build decreases to a value below the useful level for many applications if sulfonic acids are present in proportions higher than 0.1 molar ppm based on BPA, and mercaptocarboxylic acid in proportions higher than 5 molar ppm based on BPA. Thus, very small proportions of these acidic impurities can result in a disabling drop in molecular weight.

In DPC, the acidic impurities include by-product salicylic acid and ferric chloride, the latter being produced by corrosion of steel reaction vessels. Each of these can similarly inhibit molecular weight build by neutralizing the basic catalyst, salicylic acid being particularly troublesome at levels above 0.15 molar ppm, based on BPA in the transesterification reaction mixture and ferric chloride at levels above 200 ppb by weight based on BPA. In addition to its effect on molecular weight, ferric chloride can impart an undesirable brownish color to the polycarbonate.

It is believed that a conventional acid-base reaction can take place between the NaOH and the acid impurities. It was not expected, however, that the occurrence of such a reaction would cause a significant decrease in product molecular weight. Apparently, it is essential for optimum reactivity that free NaOH or the corresponding phenoxide, rather than a neutralization product thereof, be present in the reaction mixture in or very near the targeted amount.

There is considerable variation in the levels of acidic impurities from batch to batch of reagents. Therefore, the quality of the polycarbonate product can vary accordingly unless corrective measures are taken. Any such corrective measures will be dependent on accurate analysis of the reagents for acidic impurities, and such analysis is step A of the method of the invention. Such analysis is often difficult at the low levels at which they are present. However, methods have been developed for successful analyses at and near the threshold levels defined herein.

For sulfonic acid in BPA, a measured sample of several hundred grams, typically 200, is dissolved in ethyl ether and the ether solution is extracted with water to form an aqueous solution of the sulfonic acids. A measured volume of the aqueous solution is then spiked with a measured amount of p-toluenesulfonic acid, which may be employed as a solution in an alkanol such as 2-propanol. After further dilution with alkanol, the solution is titrated with a very dilute aqueous tetra-n-butylammonium hydroxide solution, typically 0.00025 M.

For mercaptocarboxylic acid in BPA, elemental analysis for sulfur can be employed with the level of sulfonic acid being subtracted from total sulfur.

For salicylic acid in DPC, it is possible to quantitatively silylate the acid with a strong silylating agent such as bis(trimethylsilyl)-trifluoroacetamide, which exists in iminol form and has the formula

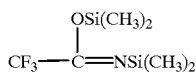

The level of the silylated product can then be determined by gas chromatography-mass spectrometry.

For ferric chloride, a simple elemental analysis for iron and chlorine can be conducted, with a detection limit for iron of 10 ppb and for chloride of 30 ppb. It should be noted that removal of ferric chloride from DPC is essentially impossible, since the two boiling points of the two are within a few degrees of each other.

Having performed the step A analysis, one can take action to optimize the properties of the polycarbonate. One possible action is to simply discard or recycle any batch of reagent having levels of acidic impurities higher than the previously designated threshold levels. In general, discarding reagent is not advantageous for cost and environmental reasons. However, recycle can be employed and the high impurity reagents mixed, for example, with other batches having low impurity levels.

An alternative to discarding or recycling reagents is to establish the NaOH level at a value sufficient to neutralize at least a portion of the acidic impurities in the reagents. This is most often a higher value than would otherwise be present, and the determination of how much to use must be done carefully, since one effect of increased NaOH level is an increase in the proportion of Fries product in the polycarbonate. It is, therefore, necessary to carefully balance the countervailing effects of higher NaOH content: neutralization of acidic impurities and increase in molecular weight against increase in Fries product levels.

According to the invention, the level of NaOH is at most 1 molar ppm (based on BPA) in excess of that of at least one of sulfonic acid, mercaptocarboxylic acid, salicylic acid and ferric chloride. That is, the total number of molar ppm of NaOH in the reaction mixture is up to the individual or total number of molar ppm of those acidic impurities, plus 1.

With respect to ferric chloride, however, there are further issues. For one thing, the stoichiometric relationship of NaOH to ferric chloride is not as simple as it is for protonic acids, since ferric chloride can undergo other types of reactions besides simple acid-base reactions. Further, at weight levels greater than about 500 ppb, ferric impurities impart a brown color to the polycarbonate; and, as previously observed, separation of ferric chloride from DPC is not feasible. Therefore, it is strongly preferred to perform the DPC-forming reactions in a non-corrodible environment, as in glass or glass-lined vessels using non-ferrous fittings and stirring means. It is also preferred to recycle any DPC batches having ferric chloride concentrations of 500 ppb by weight or greater, blending them with batches having lower levels thereof so as to obtain a material with a total proportion below 500 ppb.

The transesterification reaction generally includes a melting stage, an oligomerization stage and a polymerization stage. In the melting stage, the reactants are melted in a vessel at temperatures in the range of about 160–190° C., preferably under a blanket of an inert gas, such as nitrogen. During the melting stage, the catalyst constituents may be introduced into the vessel, at the same time or separately.

The melt is thereafter transferred to the oligomerization stage. The oligomerization stage often comprises two continuous reactors in series. The first oligomerization reactor is maintained at a temperature in the range of about 210–260° C., preferably about 230–250° C.; and a pressure in the range of about 200–50 torr, preferably about 150–120 torr, more preferably about 130 torr. The residence time in the first oligomerization reactor is preferably less than about one hour, more preferably in the range of about 45–30 minutes, even more preferably about 30 minutes.

In the second oligomerization reactor, the temperature is maintained in the range of about 250–290° C.; preferably about 270–280° C.; at a pressure of less than about 100 torr. The residence time in the second oligomerization reactor is preferably less than about 1 hour, more preferably about 30–45 minutes.

After completion of the oligomerization stage, the product is transferred to the polymerization stage. In one embodiment, the polymerization stage comprises two continuous reactors in series, a first polymerization reactor and a second polymerization reactor. In an alternative embodiment, the polymerization stage can be-carried out in a batch reactor in discrete steps of increasing temperature with decreasing pressure.

In the embodiment in which the polymerization stage comprises one reactor, the temperature of the polymerization stage is maintained in the range of about 280–320° C.; more preferably about 290–310C.; at a pressure in the range of about 10–0.01 torr; more preferably about 2–0.1 torr. The residence time in the reactor is preferably in the range of about 10–90 minutes.

In the embodiment in which the polymerization stage comprises two reactors, the temperature of the first polymerization reactor is preferably maintained in the range of about 300–315° C.; and at a pressure in the range of about 2–0.1 torr, preferably about 1–0.1 torr. The residence time in the second reactor is preferably about 5–30 minutes.

After the first polymerization reactor, the mixture is transferred to the second polymerization reactor. The temperature in the second polymerization reactor is maintained in the range of about 285–310° C. and at a pressure of about 0.2 torr. The residence time in the second reactor is preferably about 5–25 minutes.

The invention is illustrated by a series of examples in which samples of BPA and DPC were spiked with p-toluenesulfonic acid as a simulation of polystyrene sulfonic acid ion exchange resin oligomers and with 3-mercaptopropionic acid, salicylic acid and ferric chloride at various levels.

EXAMPLE 1

Glass 1—1 reactors having breakaway glass nipples for removal of the final melt and fitted with solid nickel helical agitators were soaked in 3M aqueous hydrochloric acid solution for at least 12 hours and in deionized water for at least 12 hours, and then oven dried overnight. The reactors were charged with 657 mmol of solid BPA and 709.6 mmol of solid DPC., assembled, sealed and purged 3 times with nitrogen. They were then brought with nitrogen to near-atmospheric pressure and submerged in a fluidized sand bath at 180° C.

After 5 minutes, agitation of the reactors at 250 rpm was begun. The reactants were fully melted to homogeneous mixtures after an additional 10 minutes, after which 0.132 mmol of TMAH and mixtures of 1 $\mu$mol of NaOH as a 0.001 M aqueous solution with various proportions of p-toluenesulfonic acid ("pTSA") were injected.

The temperature of the reactors was ramped to 210° C. in 5 minutes. The pressure was reduced to 180 torr for 25 minutes, after which the following regime was followed:

240° C., 15 torr, 45 min;
270° C., 2 torr, 10 min;
310° C., 1.1 torr, 30 min.

The reactors were then removed from the sand bath and the melt was quenched by extrusion into liquid nitrogen. Number average molecular weight (Mn) was determined by gel permeation chromatography relative to polystyrene. The results are given in Table 1, in comparison with a control employing only TMAH (no pTSA or sodium hydroxide)

TABLE I

| Run | pTSA, μmol | Mn |
|---|---|---|
| 1 | 0 | 8,000 |
| 2 | 0.2 | 5,200 |
| 3 | 0.4 | 3,300 |
| 4 | 0.6 | 2,400 |
| 5 | 0.8 | 2,600 |
| 6 | 1.0 | 2,300 |
| Control | — | 1,700 |

The reduction in molecular weight with an increase in sulfonic acid concentration is apparent from a comparison of Runs 2–6 with Run 1. It is also apparent that as little as 0.2 mole of sulfonic acid per mole of NaOH produces a significant decrease in molecular weight, indicating the validity of the threshold value of 0.1. The control is included to show that use of TMAH alone (without NaOH) as a catalyst is not an option, since molecular weight build is much less than is necessary to obtain a useful product.

EXAMPLE 2

The procedure of Example 1 was repeated, varying the pTSA level and maintaining the NaOH level at 5 μmol. In addition to determining the Mn of the product polycarbonate, its Fries product level was determined by methanolysis in the presence of potassium hydroxide followed by liquid chromatography. The results are given in TABLE II.

TABLE II

| Run | pTSA, μmol | Mn | Fries product, ppm |
|---|---|---|---|
| 7 | 0 | 8,400 | 3,912 |
| 8 | 1 | 8,400 | 3,309 |
| 9 | 2 | 7,100 | 1,805 |
| 10 | 3 | 7,300 | 1,379 |
| 11 | 4 | 6,700 | 353 |
| 12 | 5 | 5,900 | 240 |

These results show that one result of a fivefold increase in NaOH level is a significant and undesirable increase in the proportion of Fries product in the polycarbonate (Runs 7–10). However, the products of Runs 11–12 in which the NaOH level was no more that 1 molar ppm based on BPA had very low Fries product levels. A decrease in molecular weight at higher pTSA levels was observed, but it was not so great as to render the polycarbonate unusable.

EXAMPLE 3

The procedure of Example 1 was repeated, except that the pTSA was replaced by 3-mecarptopropionic acid ("3MPA"). The results (Mn and Fries product level) are given in Table III, in comparison with Control 3 in which no 3MPA was present.

TABLE III

| Run | 3MPA, μmol | Mn | Fries product, ppm |
|---|---|---|---|
| 13 | 0 | 8,500 | 535 |
| 14 | 1 | 7,600 | 512 |
| 15 | 2 | 7,500 | 183 |
| 16 | 14 | 7,200 | 184 |

It can be seen that 3MPA has a small but detectable effect on molecular weight and, at least at levels of 2 μmol or higher, a greater effect on Fries product level.

EXAMPLE 4

The procedure of Example 1 was repeated, varying the NaOH level and spiking with salicylic acid instead of pTSA. The results are given in Table IV, in comparison with Control 4 containing no salicylic acid.

TABLE IV

| Run | Salicylic acid, μmol | NaOH, μmol | Mn |
|---|---|---|---|
| 17 | — | 1 | 8,500 |
| 18 | 0.25 | 1 | 4,100 |
| 19 | 0.50 | 1 | 2,400 |
| 20 | 1.00 | 1 | 2,400 |
| 21 | 5.00 | 5 | 7,800 |

The adverse effect of salicylic acid on the molecular weight of the polycarbonate is apparent from a comparison of Runs 18–20 with Run 17. Run 21 shows the effect of increasing the NaOH concentration to a value equal to that of salicylic acid.

EXAMPLE 5

The procedure of Example 1 was repeated, varying the NaOH concentration and spiking with ferric chloride instead of pTSA. The results are given in Table V.

TABLE V

| Run | Ferric chloride, ppb | Ferric chloride, μmol | NaOH, μmol | Mn | Fries product, ppm |
|---|---|---|---|---|---|
| 22 | 0 | 0 | 1 | 8,500 | 575 |
| 23 | 125 | 0.77 | 1 | 8,700 | 282 |
| 24 | 250 | 1.54 | 1 | 6,300 | 205 |
| 25 | 500 | 3.08 | 1 | 3,500 | 262 |
| 26 | 0 | 0 | 5 | 9,600 | 3,912 |
| 27 | 1,058* | 1.30 | 5 | 8,400 | 885 |

*Product had brownish color.

It can be seen that at levels above 200 ppb (Runs 24–25 compared to Runs 22–23), there is a significant effect of ferric chloride on molecular weight and also on Fries product level. Runs 26–27 show the high Fries product concentration of a mixture in which the NaOH has been set at 5 μmol, and the beneficial effect on both molecular weight and Fries product level with a similar increase to balance a high ferric chloride level. It can also be seen, however, that the high ferric chloride concentration of Run 27 imparts an undesirable color to the polycarbonate.

What is claimed is:
1. A method for optimizing polycarbonate formation by a transesterification reaction between the reagents diaryl carbonate and dihydroxyaromatic compound in the presence of a catalyst system comprising at least one alkali metal hydroxide, which comprises:

(A) analyzing at least one of said reagents for acidic impurities including at least one of sulfonic acids, mercaptocarboxylic acids, salicylic acid and ferric chloride, to determine whether the following threshold values have been exceeded:
   sulfonic acids—0.1 molar ppm based on dihydroxyaromatic compound,
   mercaptocarboxylic acids—5 molar ppm based on dihydroxyaromatic compound,
   salicylic acid—0.15 molar ppm based on dihydroxyaromatic compound,
   ferric chloride—200 ppb by weight based on dihydroxyaromatic compound;
and either:
(B) discarding or recycling any reagent exceeding at least one of said threshold values, or
(C) establishing the level of alkali metal hydroxide in the polycarbonate-forming reaction mixture at a value which is at most 1 molar ppm, based on dihydroxyaromatic compound, in excess of that of at least one of sulfonic acid, mercaptocarboxylic acid, salicylic acid and ferric chloride.

2. A method according to claim 1 wherein the diaryl carbonate is diphenyl carbonate.

3. A method according to claim 1 wherein the dihydroxyaromatic compound is bisphenol A.

4. A method according to claim 1 wherein the alkali metal hydroxide is sodium hydroxide.

5. A method according to claim 1 comprising step B.

6. A method according to claim 5 wherein said reagent is recycled.

7. A method according to claim 1 comprising step C.

8. A method for optimizing polycarbonate formation by a transesterification reaction between the reagents diphenyl carbonate and bisphenol A in the presence of a catalyst system comprising sodium hydroxide, which comprises:
(A) analyzing said bisphenol A for sulfonic acids to determine whether a threshold value of at least 0.1 molar ppm, based on bisphenol A, has been exceeded, and either:
(B) discarding or recycling any bisphenol A exceeding said threshold value, or
(C) establishing the level of sodium hydroxide in the polycarbonate-forming reaction mixture at a value which is at most 1 molar ppm, based on bisphenol A, in excess of that of said sulfonic acids.

9. A method for optimizing polycarbonate formation by a transesterification reaction between the reagents diphenyl carbonate and bisphenol A in the presence of a catalyst system comprising sodium hydroxide, which comprises:
(A) analyzing said bisphenol A for mercaptocarboxylic acid to determine whether a threshold value of at least 5 molar ppm, based on bisphenol A, has been exceeded, and either:
(B) discarding or recycling any bisphenol A exceeding said threshold value, or
(C) establishing the level of sodium hydroxide in the polycarbonate-forming reaction mixture at a value which is at most 1 molar ppm, based on bisphenol A, in excess of that of said mercaptocarboxylic acid.

10. A method for optimizing polycarbonate formation by a transesterification reaction between the reagents diphenyl carbonate and bisphenol A in the presence of a catalyst system comprising sodium hydroxide, which comprises:
(A) analyzing said diphenyl carbonate for salicylic acid to determine whether a threshold value of at least 0.15 molar ppm, based on bisphenol A, has been exceeded, and either:
(B) discarding or recycling any diphenyl carbonate exceeding said threshold value, or
(C) establishing the level of sodium hydroxide in the polycarbonate-forming reaction mixture at a value which is at most 1 molar ppm, based on bisphenol A, in excess of that of said salicylic acid.

11. A method for optimizing polycarbonate formation by a transesterification reaction between the reagents diphenyl carbonate and bisphenol A in the presence of a catalyst system comprising sodium hydroxide, which comprises:
(A) analyzing said diphenyl carbonate to determine whether a threshold value of at least 200 ppb by weight, based on bisphenol A, has been exceeded, and either:
(B) discarding or recycling any diphenyl carbonate exceeding said threshold value, or
(C) establishing the level of sodium hydroxide in the polycarbonate-forming reaction mixture at a value which is at most 1 molar ppm, based on bisphenol A, in excess of that of said ferric chloride.

* * * * *